(12) United States Patent  (10) Patent No.: US 7,971,834 B2
Wang et al.  (45) Date of Patent: Jul. 5, 2011

(54) SUPPORT STAND FOR FLAT-PANEL DISPLAY MONITOR

(75) Inventors: Tie-Zhu Wang, Shenzhen (CN); Fan Zhou, Shenzhen (CN); Guo-Qi Zhang, Shenzhen (CN); Yu-Cheng Chou, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 66 days.

(21) Appl. No.: 12/471,595

(22) Filed: May 26, 2009

(65) Prior Publication Data
US 2010/0096518 A1  Apr. 22, 2010

(30) Foreign Application Priority Data

Oct. 17, 2008  (CN) .......................... 2008 1 0304974

(51) Int. Cl.
*A47F 5/00* (2006.01)
(52) U.S. Cl. ..................... 248/125.1; 248/917; 248/923; 361/679.06; 361/679.22
(58) Field of Classification Search .................... 16/241, 16/376, 386; 248/125.1, 133, 917, 922, 923, 248/122.1, 407; 361/679.06, 679.21, 679.22
See application file for complete search history.

(56) References Cited

U.S. PATENT DOCUMENTS

| | | | |
|---|---|---|---|
| 5,812,368 A * | 9/1998 | Chen et al. ............... | 361/679.06 |
| 6,347,433 B1 * | 2/2002 | Novin et al. .................... | 16/367 |
| 6,532,628 B2 * | 3/2003 | Kim ............................... | 16/342 |
| 6,666,422 B1 * | 12/2003 | Lu et al. ...................... | 248/291.1 |
| 6,929,224 B1 * | 8/2005 | Masuda et al. ............. | 248/176.3 |
| 7,338,019 B2 * | 3/2008 | Liu et al. ................... | 248/123.11 |
| 7,494,104 B2 * | 2/2009 | Baek ........................... | 248/372.1 |
| 7,516,925 B2 * | 4/2009 | Sawai et al. .................... | 248/146 |
| 7,567,436 B2 * | 7/2009 | Jeong ........................ | 361/679.22 |
| 7,578,490 B2 * | 8/2009 | Kim .......................... | 248/281.11 |
| 7,593,218 B2 * | 9/2009 | Hwang et al. ............. | 361/679.21 |
| 7,604,210 B2 * | 10/2009 | Oddsen et al. ............ | 248/280.11 |
| 7,694,919 B2 * | 4/2010 | Lee ............................ | 248/123.11 |
| 7,694,929 B2 * | 4/2010 | Jang ........................... | 248/372.1 |
| 7,770,856 B2 * | 8/2010 | Depay ......................... | 248/284.1 |
| 2003/0223188 A1 * | 12/2003 | Ha et al. ......................... | 361/681 |
| 2004/0021051 A1 * | 2/2004 | Chiu .............................. | 248/371 |
| 2004/0217244 A1 * | 11/2004 | Wu et al. ...................... | 248/278.1 |
| 2008/0301906 A1 * | 12/2008 | Chiang et al. .................. | 16/241 |
| 2009/0158554 A1 * | 6/2009 | Chang et al. ................... | 16/241 |

* cited by examiner

*Primary Examiner* — Terrell McKinnon
*Assistant Examiner* — Bradley H Duckworth
(74) *Attorney, Agent, or Firm* — Clifford O. Chi

(57) ABSTRACT

A support stand for a flat-panel display monitor includes a rotatable bracket, a hinge assembly, a base member, a first link bracket, and a second link bracket. The first and second link brackets are rotatably assembled between the rotatable bracket and the support member via the hinge assembly. The rotatable bracket defines a pivot hole, and a guiding notch communicating with the pivot hole. The hinge assembly includes a pivotal shaft, and a positioning washer sleeved on the pivotal shaft. The pivotal shaft is engaged in the pivot hole of the rotatable bracket from the guiding notch. The positioning washer is fixed on the rotatable bracket to prevent the pivotal shaft from disengaging from the pivot hole.

19 Claims, 4 Drawing Sheets

SUPPORT STAND FOR FLAT-PANEL DISPLAY MONITOR

BACKGROUND

1. Technical Field

The present disclosure generally relates to support stands and, particularly, to a support stand for a flat-panel display monitor.

2. Description of Related Art

Flat-panel display monitors, such as liquid crystal display monitors, offer advantages over cathode ray tube displays, such as reduced size, smaller weight, and better image quality. A viewing angle and height of the flat-panel display monitor can be adjusted without moving a support stand of the flat-panel display monitor because of its small weight.

A typical support stand generally includes a bracket to attach to the flat-panel display monitor, a rotatable bracket connected to the bracket, an elevating mechanism, a support member, and a base member to mount the support member. The elevating mechanism is rotatably connected to the rotatable bracket via a hinge assembly.

The hinge assembly includes many components positioned between the rotatable bracket and the elevating mechanism to increase frictional forces to retain the flat-panel display monitor in a desired viewing angle. When assembling the typical support stand, the components of the hinge assembly must be positioned by an external force to enable a shaft hole of each component to be aligned with a shaft hole of the rotatable bracket and a shaft hole of the elevating mechanism. A pivotal shaft of the hinge assembly can then be inserted through the components, the rotatable bracket and the elevating mechanism, one by one. However, it is difficult to align the shaft holes of the components with the shaft holes of the rotatable bracket and the elevating mechanism, thus making it inconvenient to assemble the typical support stand.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
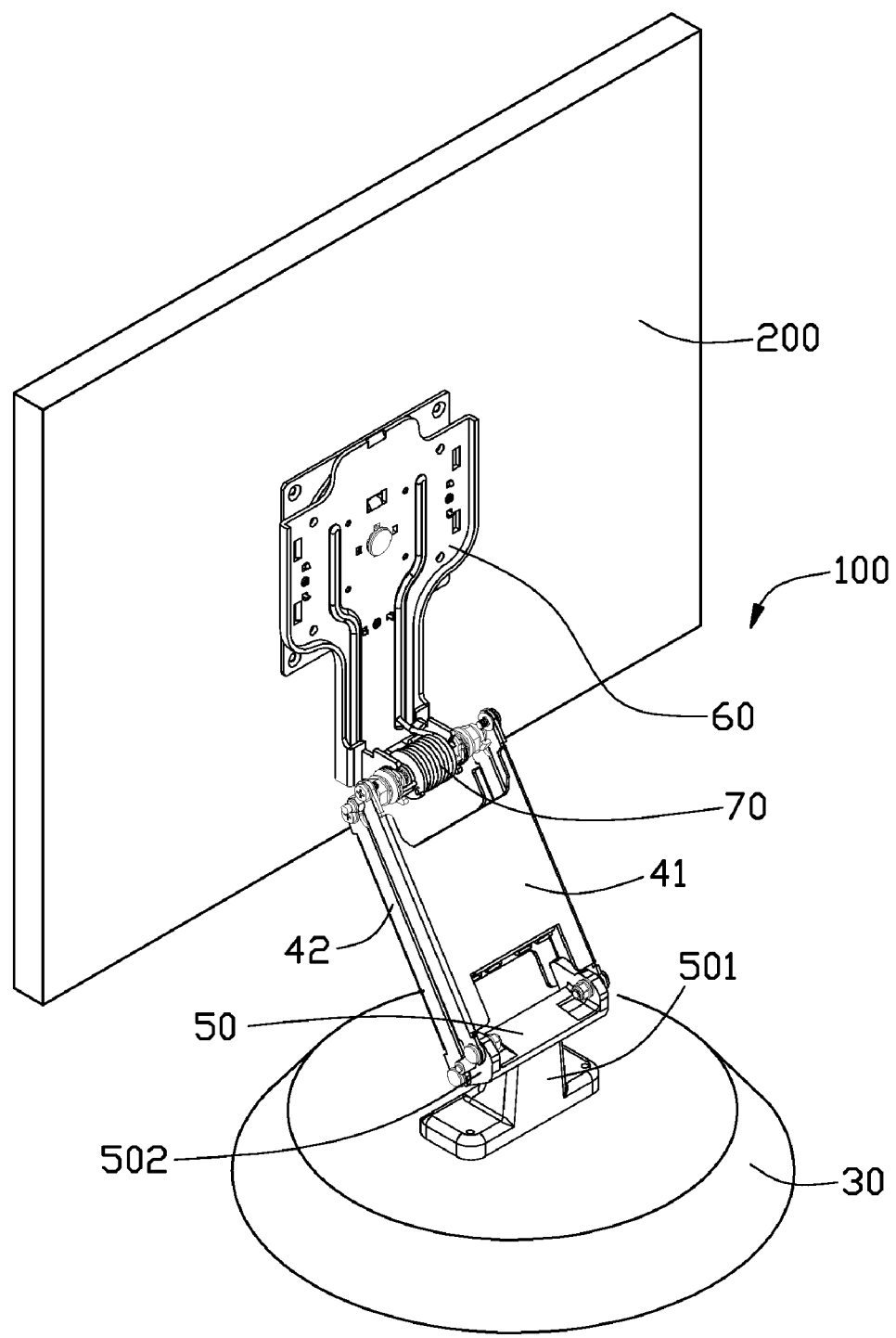
FIG. 1 is an assembled, isometric view of an embodiment of a support stand for a flat-panel display monitor, the support stand including a hinge assembly.

Referring to FIG. 1, an embodiment of a support stand 100 includes a rotatable bracket 60 to hold a flat-panel display monitor 200, a first link bracket 41, a second link bracket 42, a support member 50, a base member 30 to mount the support member 50, and a hinge assembly 70. The first and second link brackets 41, 42 are rotatably mounted to the rotatable bracket 60 via the hinge assembly 70 and the base member 50 by the support member 50.

Figure 2:
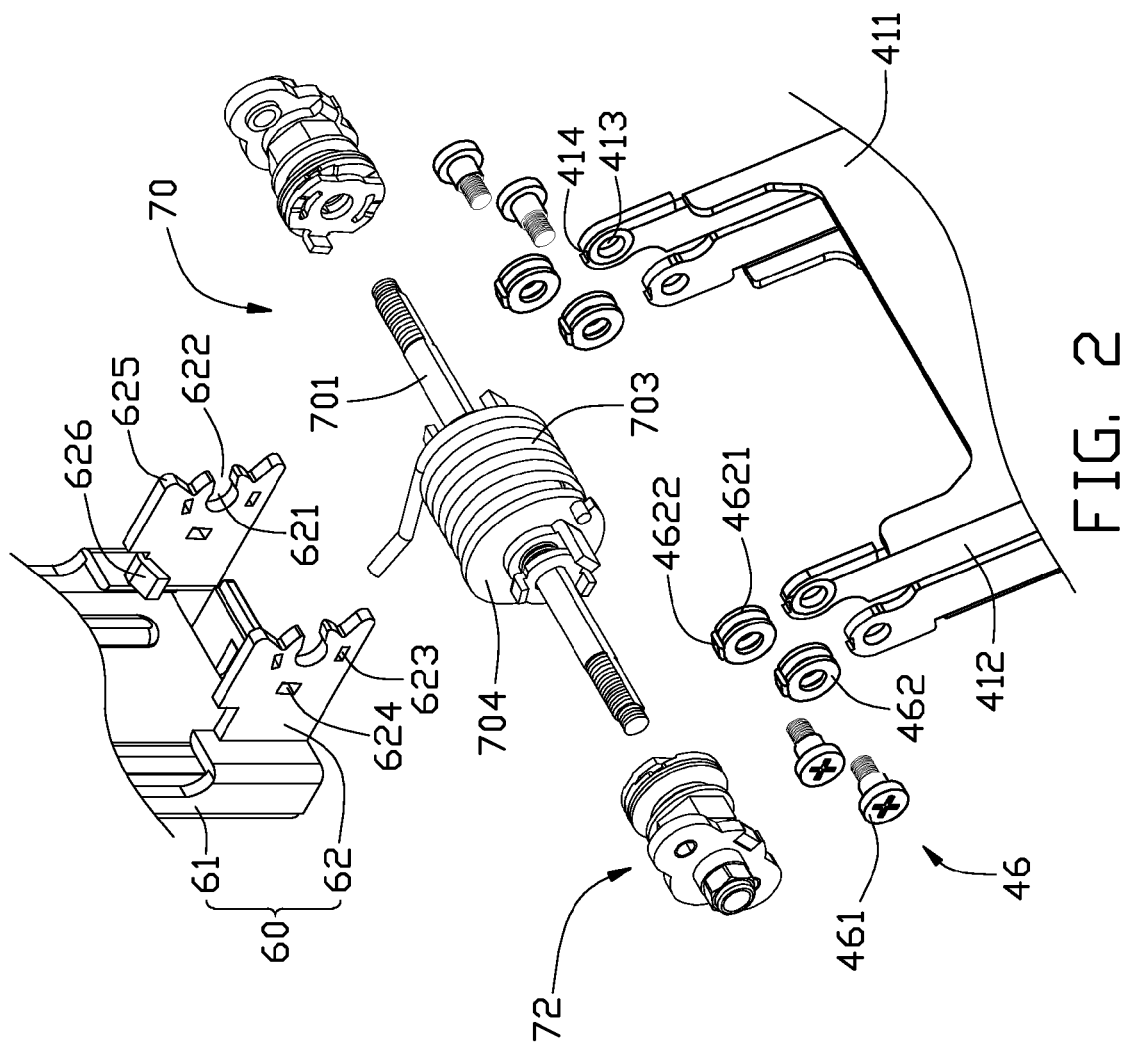
FIG. 2 is a partial, exploded, isometric view of the support stand in FIG. 1.

Referring also to FIG. 2, the rotatable bracket 60 includes a mounting board 61, and two side walls 62 extending from opposite sides of the mounting board 61. The mounting board 61 is fixed to the flat-panel display monitor 200. Each side wall 62 defines a pivot hole 621, and a guiding notch 622 communicating with the pivot hole 621. The guiding notch 622 is defined in an edge portion of the side wall 62 away from the mounting board 61. Each side wall 62 also defines two positioning holes 623 and a fixing hole 624 adjacent to the pivot hole 621, and forms two limiting protrusions 625 on the edge portion away from the mounting board 61. A restricting tab 626 is formed on one side wall 62 adjacent to the mounting board 61.

The first link bracket 41 may be substantially H-shaped, and includes a link sheet 411 and two side walls 412 extending substantially perpendicularly from opposite sides of the link sheet 411. Each side wall 412 defines a substantially circular link hole 413 in an end portion, and a latching groove 414 in an edge portion adjacent to the link hole 413. The second link bracket 42 is similar in principle to the first link bracket 41.

The support member 50 includes a holder 501 mounted on the base member 30, and two supporting blocks 502 extending substantially perpendicularly from opposite ends of a top portion of the holder 501. In the illustrated embodiment, the holder 501 is substantially I-shaped.

Figure 3:
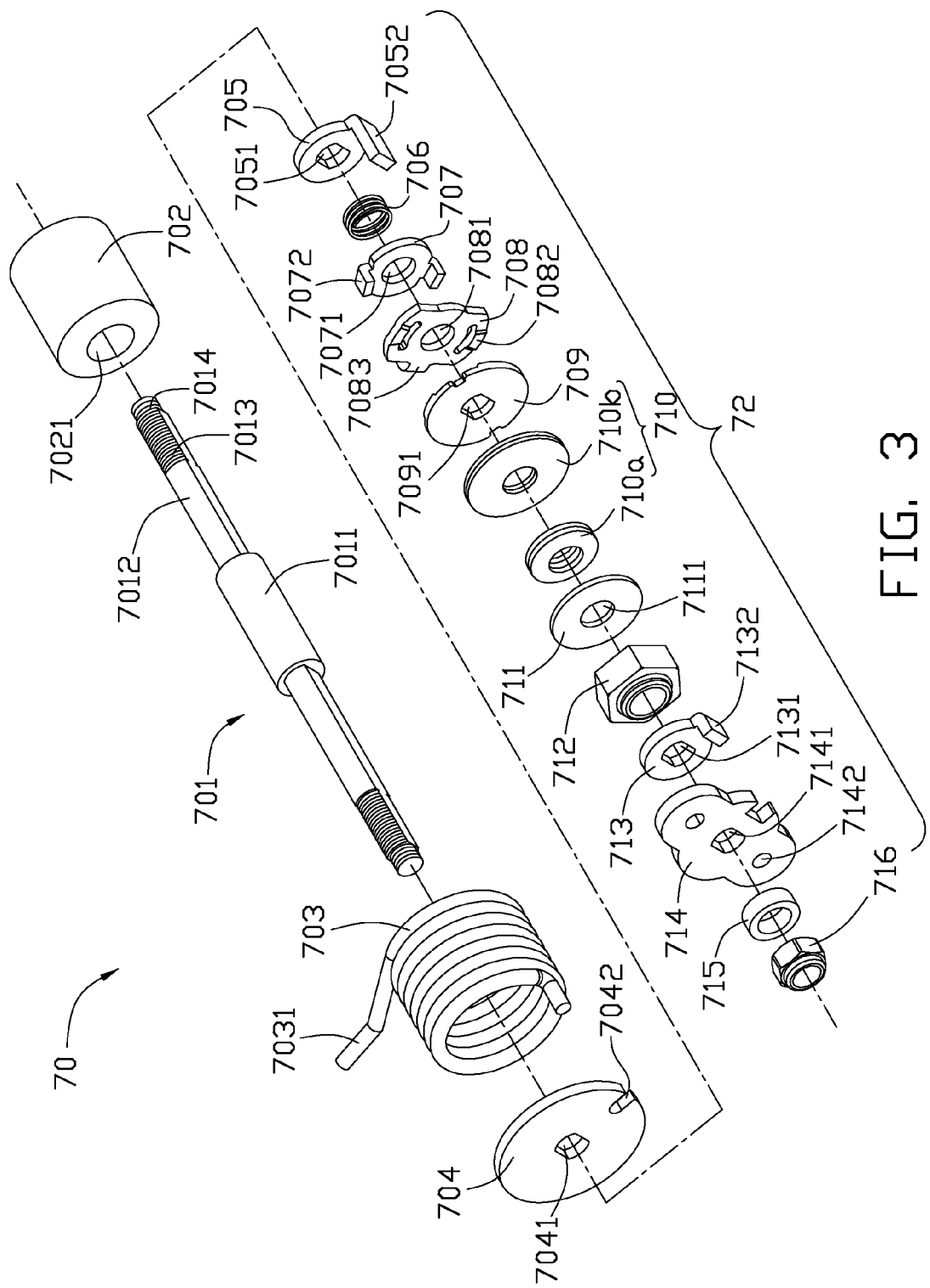
FIG. 3 is a partial, exploded, isometric view of the hinge assembly in FIG. 1.
Figure 4:
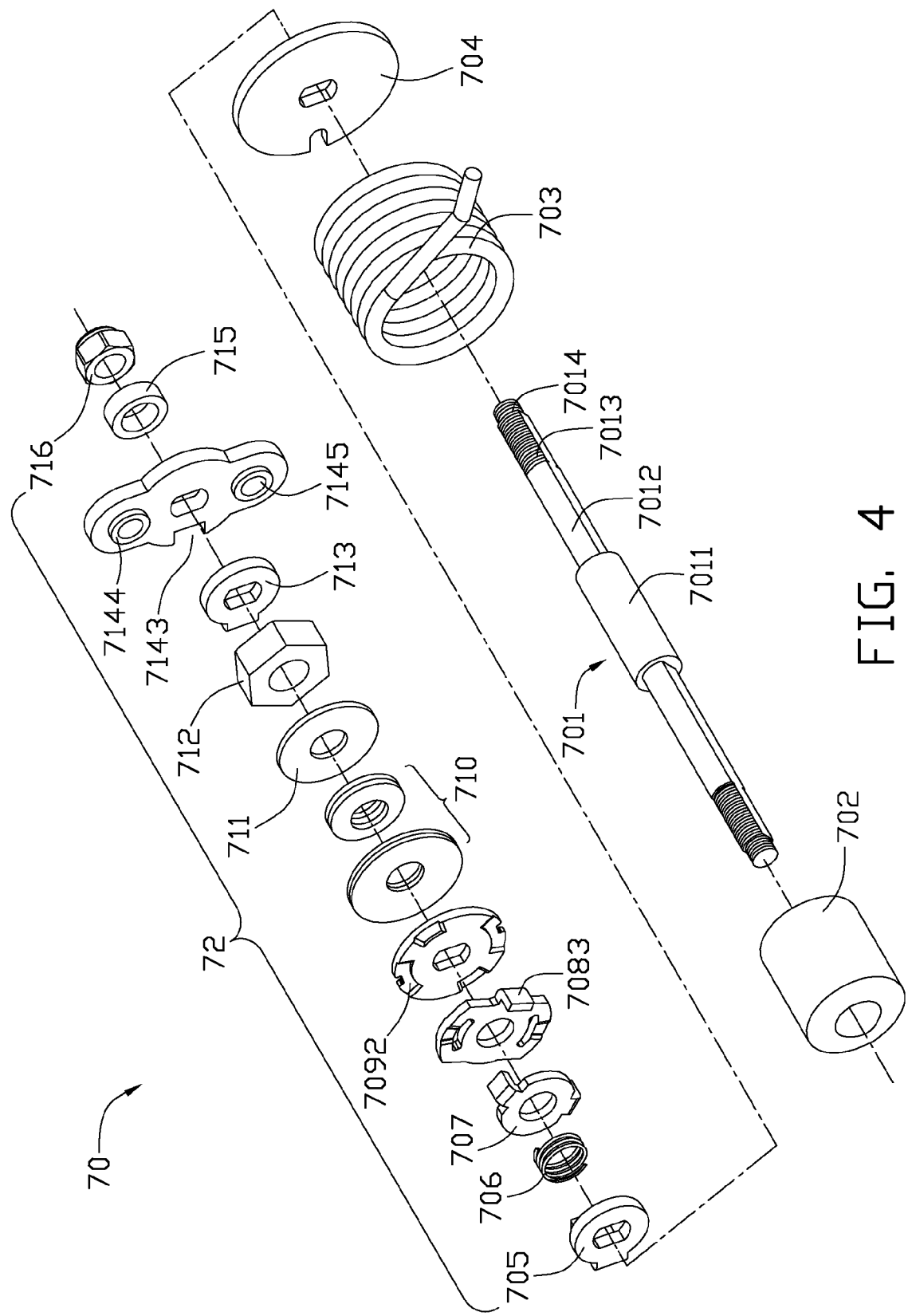
FIG. 4 is similar to FIG. 3, but viewed from another direction.

Referring also to FIGS. 3 and 4, the hinge assembly 70 includes a pivotal shaft 701, a sleeve 702, a torsion spring 703, and a restricting washer 704 sleeved on the middle portion of the pivotal shaft 701. The hinge assembly 70 also includes two pivotal modules 72 symmetrically sleeved on opposite ends of the pivotal shaft 701. Each pivotal module 72 includes a limiting washer 705, an elastic member 706, a positioning washer 707, a rotating washer 708, a stationary washer 709, a resilient member 710, a flat washer 711, a fastening member 712, a frictional washer 713, a connecting member 714, a ring 715, and a securing member 716.

The pivotal shaft 701 includes a mounting portion 7011, and two shaft portions 7012 extending from opposite ends of the mounting portion 7011. A cross-section of the mounting portion 7011 is substantially circular. A cross-section of the shaft portion 7012 may be non-circular. The shaft portion 7012 has a smaller cross-sectional area than the mounting portion 7011. Each shaft portion 7012 forms a threaded portion 7013 on an end away from the mounting portion 7011. Each shaft portion 7012 also forms an end portion 7014 on a distal end adjacent to the threaded portion 7013. The end portion 7014 is threaded.

The sleeve 702 may be substantially cylindrical, and rotatably sleeved on the mounting portion 7011 of the pivotal shaft 701.

The torsion spring 703 includes a plurality of spring rings sleeved on the sleeve 702, and two latching portions 7031 extending from the opposite ends of the torsion spring 703.

The restricting washer 704 defines a deformed through hole 7041 in the middle portion so that the restricting washer 704 is non-rotatably sleeved on the shaft portion 7012. The restricting washer 704 further defines a cutout 7042 in an edge portion to receive one of the latching portions 7031 of the torsion spring 703.

The limiting washer 705 defines a deformed through hole 7051 in the middle portion so that the limiting washer 705 is non-rotatably sleeved on the shaft portion 7012. A limiting tab 7052 is formed on an edge portion of the limiting washer 705 to resist against the two limiting protrusions 625 of the rotatable bracket 60, thus defining a rotation range of the rotatable bracket 60.

In the illustrated embodiment, the elastic member 706 is a helical spring.

The positioning washer 707 defines a substantially circular through hole 7071 in the middle portion so that the positioning washer 707 is rotatably sleeved on the shaft portion 7012. The positioning washer 707 forms two positioning tabs 7072 on opposite edge portions to be inserted in the positioning holes 623 of the rotatable bracket 60.

The rotating washer 708 defines a substantially circular through hole 7081 in the middle portion so that the rotating washer 708 is rotatably sleeved on the shaft portion 7012. The rotating washer 708 forms two positioning protrusions 7082 on a side surface, and a fixing tab 7083 on an edge portion to be inserted in the fixing hole 624 of the rotatable bracket 60.

The stationary washer 709 defines a deformed through hole 7091 in a middle portion so that the stationary washer 709 is non-rotatably sleeved on the shaft portion 7012. The stationary washer 709 defines four positioning grooves 7092 in a side surface to engage with the positioning protrusions 7082 of the rotating washer 708.

The resilient member 710 includes a plurality of first spring washers 710a and a plurality of second spring washers 710b.

The flat washer 711 defines a substantially circular through hole 7111 in the middle portion so that the flat washer 711 is rotatably sleeved on the shaft portion 7012.

The fastening member 712 may be a nut engaging with the threaded portion 7013 of the pivotal shaft 701.

The frictional washer 713 defines a deformed through hole 7131 in the middle portion so that the frictional washer 713 is non-rotatably sleeved on the pivotal shaft 7012. A retaining tab 7132 is formed on an edge portion of the frictional washer 713.

The connecting member 714 defines a deformed through hole 7141 in the middle portion so that the connecting member 714 is non-rotatably sleeved on the pivotal shaft 7012. The connecting member 714 also defines two substantially circular through holes 7142 in two ends, and a notch 7143 in an edge portion adjacent to the deformed through hole 7141. The connecting member 714 forms two protruding poles 7144 in a side surface corresponding to the through holes 7142. Each protruding pole 7144 defines a threaded hole 7145 communicating with the through hole 7142.

The ring 715 is rotatably sleeved on the pivotal shaft 7012.

The securing member 716 may be a nut engaging with the end portion 7014 of the pivotal shaft 701.

The support stand 100 further includes four connecting modules 46 (shown in FIG. 2) to connect the first and second link brackets 41, 42 to the connecting members 714. Each connecting module 46 includes a connecting pin 461 and a protecting member 462. The protecting member 462 includes a pair of washers 4621 positioned opposite to each other, and a latching tab 4622 connecting the pair of washers 4621.

The support stand 100 may be assembled as follows. Firstly, the sleeve 702 is sleeved on the mounting portion 7011 of the pivotal shaft 701. The torsion spring 703 is sleeved on the sleeve 702. The restricting washer 704, the limiting washer 705, the elastic member 706, and the positioning washer 707 are sleeved on the shaft portion 7012. Secondly, the elastic member 706 is compressed by an external force until the pivotal shaft 701 engages in the pivot holes 621 of the rotatable bracket 60 from the guiding notches 622. One latching portion 7031 of the torsion spring 703 is latched at the bottom surface of the restricting tab 626 of the rotatable bracket 60, and the other latching portion 7031 of the torsion spring 703 is latched in the cutout 7042 of the restricting washer 704. Thirdly, the external force applied on the elastic member 706 is released. Thus, the positioning washer 707 is pushed by the elastic member 706, so that the positioning tabs 7072 are inserted in the positioning holes 623 of the rotatable bracket 60, thereby preventing the pivotal shaft 701 from disengaging from the pivot holes 621. Fourthly, the rotating washer 708, the stationary washer 709, the resilient member 710, and the flat washer 711 are sleeved on the shaft portion 7012 in that order, and the fastening member 712 is engaged with the threaded portion 7013. The fixing tab 7083 of the rotating washer 708 is inserted in the fixing hole 624 of the rotatable bracket 60. The positioning protrusions 7082 of the rotating washer 708 are engaged in the positioning grooves 7092 of the stationary washer 709. The frictional washer 713, the connecting member 714, and the ring 715 are then sleeved on the threaded portion 7013, and the securing member 716 is engaged with the end portion 7014 of the pivotal shaft 701. The retaining tab 7132 of the frictional washer 713 is then inserted in the notch 7143 of the connecting member 714.

Finally, to assemble the first and second link brackets 41, 42, the latching tab 4622 of the protecting member 462 is latched in the latching groove 414 of the first link bracket 41, so that the pair of washers 4621 is positioned on opposite sides of the side wall 412 correspondingly. The connecting shaft 461 is inserted through the link hole 413 of the first link bracket 41 and one through hole 7142 of the connecting member 714, and engaged in the threaded hole 7145 of the connecting member 714. Thus, a first end portion of the first link bracket 41 is rotatably assembled on one end of the connecting member 714. Accordingly, a corresponding first end portion of the second link bracket 42 is rotatably assembled on the other end of the connecting member 714 by the connecting module 46. Similarly, the second end portions of the first and second link brackets 41, 42 are correspondingly assembled on two ends of the supporting block 502 of the support member 50.

In use, an external force is applied on the flat-panel display monitor 200 to drive the rotatable bracket 60 to rotate along an axis of the hinge assembly 70 relative to the first and second link brackets 41, 42, thereby adjusting the viewing angle of the flat-panel display monitor 200. The resilient member 710 becomes compressed and creates an axial force to push the components of the hinge assembly 70 to contact each other tightly. Thus, the flat-panel display monitor 200 may be stably maintained at a desired angle relative to the first and second link brackets 41, 42 due to the frictional forces generated between the components of the hinge assembly 70. A torsion force of the torsion spring 703 either increases or decreases according to the rotation of the rotatable bracket 60, thereby preventing an excessive force from damaging the hinge assembly 70.

When the height of the flat-panel display monitor 200 needs to be changed, the flat-panel display monitor 200 is pushed upwards or downwards so that the first and second link brackets 41, 42 are adjusted to increase or decrease the height of the flat-panel display monitor 200. During the adjusting process, the height of the flat-panel display monitor 200 changes, but the viewing angle of the flat-panel display monitor 200 remains the same. When the flat-panel display monitor is lifted to a desired height, the flat-panel display monitor can be stably maintained at the desired height by frictional forces generated between the components of the connecting modules 46.

In the assembly of the support stand 100, the partially assembled hinge assembly 70 can be easily assembled in the pivot holes 621 of the rotatable bracket 60 from the guiding notches 622. The positioning washers 707 are engaged on the rotatable bracket 60 to prevent the pivotal shaft 701 from disengaging from the pivot holes 621. Then the other components of the hinge assembly 70 are successively sleeved on the pivotal shaft 701. Since the components of the hinge assembly 70 do not need to be positioned by an external force, the assembly of the support stand 100 is easy and convenient. It should be understood that, the hinge assembly 70 may be assembled separately, and then may be easily assembled in the pivot holes 621 of the rotatable bracket 60 from the guiding notches 622.

In alternative embodiments, the elastic member 706 may be omitted, and the positioning washer 707 may be fixed on the outer side surface of the side wall 62. The sleeve 702, the flat washer 711, and the fastening member 712 may all be omitted. The guiding notch 622 may be defined in the top portion or the bottom portion of the side wall 62 to communicate with the pivot hole 621. The first and second link brackets 41, 42 may be replaced by other elevating structures.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A support stand for a flat-panel display monitor, comprising:
   a rotatable bracket defining a pivot hole, and a guiding notch communicating with the pivot hole; and
   a hinge assembly comprising a pivotal shaft, and a positioning washer sleeved on the pivotal shaft, the pivotal shaft being engaged in the pivot hole of the rotatable bracket from the guiding notch, the positioning washer being fixed on the rotatable bracket to prevent the pivotal shaft from disengaging from the pivot hole;
   wherein the rotatable bracket comprises a mounting board, and two side walls extending from opposite sides of the mounting board; the pivot hole is defined in each side wall of the rotatable bracket, the guiding notch is defined in an edge portion of each side wall away from the mounting board.

2. The support stand of claim 1, wherein each side wall of the rotatable bracket defines a positioning hole adjacent to the pivot hole; the positioning washer forms a positioning tab on an edge portion to be fixed in the positioning hole of each side wall.

3. The support stand of claim 1, wherein each side wall forms two limiting protrusions on the edge portion away from the mounting board; the hinge assembly further comprises a limiting washer non-rotatably sleeved on the pivotal shaft; the limiting washer forms a limiting tab on an edge portion to resist against the limiting protrusions, thus defining a rotation range of the rotatable bracket.

4. The support stand of claim 1, wherein the hinge assembly further comprises an elastic member sleeved on the pivotal shaft to provide an elastic force for the positioning washer.

5. The support stand of claim 1, wherein the hinge assembly further comprises a torsion spring rotatably sleeved on the pivotal shaft, and a restricting washer non-rotatably sleeved on the pivotal shaft; the restricting washer defines a cutout; the rotatable bracket forms a restricting tab; the torsion spring comprises a first latching portion latched at a bottom surface of the restricting tab of the rotatable bracket, and a second latching portion latched in the cutout of the restricting washer.

6. The support stand of claim 1, wherein the hinge assembly further comprises a rotating washer rotatably sleeved on the pivotal shaft, and a stationary washer non-rotatably sleeved on the pivotal shaft; the rotating washer forms a positioning protrusion on a side surface, the stationary washer defines a positioning groove in a side surface to engage with the positioning protrusion of the rotating washer.

7. The support stand of claim 1, wherein the hinge assembly further comprises a resilient member, a flat washer, and a fastening member sleeved on the pivotal shaft to provide frictional force for the rotatable bracket.

8. The support stand of claim 1, further comprising a first link bracket, a second link bracket, and a support member; the first and second link brackets are rotatably assembled between the rotatable bracket and the support member via the hinge assembly.

9. The support stand of claim 8, wherein the hinge assembly further comprises a connecting member non-rotatably sleeved on the pivotal shaft; the support member comprises a supporting block; first end portions of the first and the second link brackets are rotatably assembled on two ends of the connecting member, and second end portions of the first and the second link brackets are rotatably assembled on two ends of the supporting block.

10. The support stand of claim 9, wherein the hinge assembly further comprises a frictional washer non-rotatably sleeved on the pivotal shaft; the connecting member defines a notch in an edge portion; the frictional washer forms a retaining tab on an edge portion to be inserted in the notch of the connecting member.

11. The support stand of claim 9, further comprising a protecting member; the first end portions of the first and the second link brackets define a latching groove; the protecting member comprises a pair of washers positioned opposite to each other, and a latching tab connecting the pair of washers; the latching tab is latched in the latching groove, the pair of washers are positioned on opposite sides of one of the first end portions of the first and the second link brackets.

12. A support stand for a flat-panel display monitor, comprising:
   a rotatable bracket defining a pivot hole, and a guiding notch communicating with the pivot hole;
   a hinge assembly comprising a pivotal shaft, and a positioning washer sleeved on the pivotal shaft, the pivotal shaft being engaged in the pivot hole of the rotatable bracket from the guiding notch, the positioning washer being fixed on the rotatable bracket to prevent the pivotal shaft from disengaging from the pivot hole;
   a support member; and
   a first link bracket and a second link bracket, the first and second link bracket rotatably assembled between the rotatable bracket and the support member via the hinge assembly;
   wherein the rotatable bracket comprises a mounting board, and two side walls extending from opposite sides of the mounting board; the pivot hole is defined in each side wall of the rotatable bracket, the guiding notch is defined in an edge portion of each side wall away from the mounting board.

13. The support stand of claim 12, wherein the hinge assembly further comprises a connecting member non-rotatably sleeved on the pivotal shaft; the support member comprises a supporting block; first end portions of the first and the second link brackets are rotatably assembled on two ends of the connecting member, and second end portions of the first and the second link brackets are rotatably assembled on two ends of the supporting block.

14. The support stand of claim 13, wherein each of the first and the second link brackets is substantially H-shaped, and comprises a link sheet and two side walls extending from opposite sides of the link sheet; the first end portion and the second end portion are formed at two ends of each side wall.

15. The support stand of claim 12, wherein each side wall of the rotatable bracket defines a positioning hole adjacent to the pivot hole; the positioning washer forms a positioning tab on an edge portion to be fixed in the positioning hole of each side wall.

16. The support stand of claim 12, wherein each side wall forms two limiting protrusions on the edge portion away from the mounting board; the hinge assembly further comprises a limiting washer non-rotatably sleeved on the pivotal shaft; the limiting washer forms a limiting tab on an edge portion to engage with the limiting protrusions, thus defining a rotatable range of the rotatable bracket.

17. The support stand of claim 12, wherein the hinge assembly further comprises a torsion spring rotatably sleeved on the pivotal shaft, and a restricting washer non-rotatably sleeved on the pivotal shaft; the restricting washer defines a cutout; the rotatable bracket forms a restricting tab; the torsion spring comprises a first latching portion latched at a bottom surface of the restricting tab of the rotatable bracket, and a second latching portion latched in the cutout of the restricting washer.

18. The support stand of claim 12, wherein the hinge assembly further comprises a rotating washer rotatably sleeved on the pivotal shaft, and a stationary washer non-rotatably sleeved on the pivotal shaft; the rotating washer forms a positioning protrusion on a side surface, the stationary washer defines a positioning groove in a side surface to engage with the positioning protrusion of the rotating washer.

19. A support stand for a flat-panel display monitor, comprising:
   a rotatable bracket defining a pivot hole, and a guiding notch communicating with the pivot hole; and
   a hinge assembly comprising a pivotal shaft, and a positioning washer sleeved on the pivotal shat, the pivotal shaft being engaged in the pivot hole of the rotatable bracket from the guiding notch, the positioning washer being fixed on the rotatable bracket to prevent the pivotal shaft from disengaging from the pivot hole, further comprising a first link bracket, a second link bracket, and a support member, the first and second link brackets are rotatably assembled between the rotatable bracket and the support member via the hinge assembly, wherein the hinge assembly further comprises a connecting member non-rotatably sleeved on the pivotal shaft and a frictional washer non-rotatably sleeved on the pivotal shaft; the support member comprises a supporting block; first end portions of the first and second link brackets are rotatably assembled on two ends of the connecting member, and second end portions fo the first and second link brackets are rotatably assembled on two ends of the supporting block; the connecting member defines a notch in an edge portion; the frictional washer forms a retaining tab on an edge portion to be inserted in the notch of the connecting member.

\* \* \* \* \*